(12) United States Patent
Payack

(10) Patent No.: US 8,351,171 B2
(45) Date of Patent: Jan. 8, 2013

(54) INTEGRATED AUTOMATIC SELECTION OF MAINTENANCE MODE IN ELECTRONIC TRIPPING SYSTEMS TO MINIMIZE ARC FAULT ENERGY

(75) Inventor: Walter Payack, Duluth, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 469 days.

(21) Appl. No.: 12/575,928

(22) Filed: Oct. 8, 2009

(65) Prior Publication Data

US 2010/0133922 A1 Jun. 3, 2010

Related U.S. Application Data

(60) Provisional application No. 61/105,123, filed on Oct. 14, 2008.

(51) Int. Cl.
*H02H 3/00* (2006.01)
*H02H 7/00* (2006.01)

(52) U.S. Cl. .......................................... 361/62; 361/94

(58) Field of Classification Search ................... 361/2, 3, 361/62–66, 94–97
See application file for complete search history.

(56) References Cited

U.S. PATENT DOCUMENTS

| 7,203,040 B2 * | 4/2007 | Shipp et al. ................... 361/5 |
| 7,292,422 B2 | 11/2007 | Culligan et al. |
| 2006/0114630 A1 * | 6/2006 | Culligan et al. ................ 361/62 |
| 2008/0142486 A1 * | 6/2008 | Vicente et al. ................ 218/154 |

* cited by examiner

*Primary Examiner* — Rexford Barnie
*Assistant Examiner* — Christopher Clark

(57) ABSTRACT

A monitor control system and method for an electrical distribution system includes a trip unit of a circuit breaker. A sensor is associated with the electrical distribution system and coupled to the trip unit wherein the sensor is connected to one or more components of the electrical distribution system to detect whether the electrical distribution system is being serviced when a presence of a human being is also detected. A selector is coupled to the trip unit and configured to select maintenance mode parameters to define a mode of operation of the trip unit wherein in the maintenance mode arc flash reduction or tripping delay reduction is provided such that the trip unit operates based on the maintenance mode parameters.

26 Claims, 4 Drawing Sheets

INTEGRATED AUTOMATIC SELECTION OF MAINTENANCE MODE IN ELECTRONIC TRIPPING SYSTEMS TO MINIMIZE ARC FAULT ENERGY

RELATED APPLICATION INFORMATION

This application claims priority to Provisional Application Ser. No. 61/105,123 filed on Oct. 14, 2008, incorporated herein by reference.

BACKGROUND

1. Technical Field

This disclosure relates to fault detection circuits, and more particularly, to an apparatus and method for electronic tripping systems and methods that minimize arc energy for safety during maintenance.

2. Description of the Related Art

Proper system maintenance and safety are the constant concern of electrical equipment manufacturers and servicers. In particular, arc fault is one area where manufacturers are looking for ways to make their equipment inherently safer to users who maintain electrical systems. Under normal operating conditions, electrical equipment is enclosed by a "dead-front" enclosure to protect people from accidental contact with energized parts, and to contain any gases or exhaust that may occur during a tripping operation.

In a power or main circuit breaker system within an electric distribution system, a main circuit breaker or power circuit breaker is connected between a power source terminal and a plurality of branch load circuits. Additionally, feeder circuits may be coupled in the electrical distribution system. Typically, each branch or feeder circuit is protected by a circuit breaker or fuse connected between the power source and the load, such as an induction motor or the like. In operation, the main circuit breaker typically is configured to operate or trip at a higher power setting current pass through, then the branch circuit breakers or feeder circuit breakers.

If a short circuit or other reason to cut power to a specific load circuit occurs, the feeder or branch circuit breaker is configured to open before the time delay designed into the main circuit breaker. In such operation, only the affected load is cut from the electrical distribution system with the remaining load circuits continuing to be connected to the electrical distribution system.

In the event that personnel have to enter the area where a short circuit exists or work on an electrical machine is needed, there is a possibility of arc flash from the surrounding "live" circuitry. An arc flash hazard is defined as a dangerous condition associated with the release of energy caused by an electrical arc.

An electrical arc operates at temperatures of several thousand degrees Celsius and creates a pressure wave, not unlike an explosion, causing metal particles, equipment parts and other loose items to be expelled from the electrical arc flash area in addition to the expulsion of hot, ionized gases. If a human being is in the vicinity of such arc flash hazard, bodily injury, including death, can result.

In addition to warnings, the setting of boundaries that mark where personnel may not enter without wearing appropriate protective gear/clothing is used to designate the arc flash hazard area. Before personnel can approach electrical gear within such designated flash protection boundary, the personnel would be required to wear fire-retardant arc flash suits which are uncomfortable, expensive and limit the personnel's ability to work on the electrical equipment. Another alternative available to working in the arc flash hazard protected area is to open the main circuit breaker which would cut power to all of the branch and feeder circuits protected by such main circuit breaker. Such procedure is expensive and inefficient.

SUMMARY OF THE INVENTION

A system and method for operation of a main circuit breaker system is disclosed including a trip unit that is capable of being programmed to operate in response to different parameters corresponding to conditions relating to a main circuit breaker system. Such conditions may include the presence of a living being, such as a human being, within a designated area and a maintenance mode switch being activated to indicate equipment being serviced. The system and method are also provided for reducing arc flash in a main circuit breaker system when a human being enters a predetermined flash protection boundary to service equipment. The control device is coupled to a trip unit of the main circuit breaker that can change the instantaneous and short time protective settings of the circuit in response to a predetermined set of conditions.

A monitor control system and method for an electrical distribution system include a trip unit of a circuit breaker. A sensor is associated with the electrical distribution system and coupled to the trip unit wherein the sensor is connected to one or more components of the electrical distribution system to detect whether the electrical distribution system is being serviced when a presence of a human being is also detected. A selector is coupled to the trip unit and configured to select maintenance mode parameters to define a mode of operation of the trip unit wherein in the maintenance mode arc flash reduction or tripping delay reduction is provided such that the trip unit operates based on the maintenance mode parameters.

A monitor control system for an electrical distribution system includes a trip unit for a circuit breaker. A boundary detection sensor is configured to detect a human presence in a boundary surrounding at least a portion of the electrical distribution system. At least one sensor is associated with the electrical distribution system and is coupled to the trip unit, wherein the at least one sensor is connected to one or more serviceable enclosures of the electrical distribution system to detect whether the electrical distribution system will be or is being serviced when the presence of a human being is also detected by the boundary detection sensor. A selector is coupled to the trip unit and configured to select maintenance mode parameters to define a mode of operation of the trip unit, wherein in the maintenance mode arc flash reduction and tripping delay reduction are provided such that the trip unit operates based on the maintenance mode parameters.

A method for protecting service personnel includes detecting a presence of service personnel in an area of an electrical distribution system by detecting a characteristic maintenance condition; selecting maintenance mode parameters in accordance with a signal generated by the detection of the characteristic maintenance condition; and setting trip conditions for a trip unit to reduce arc flash energy and tripping delay during the characteristic maintenance condition.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

Figure 1:
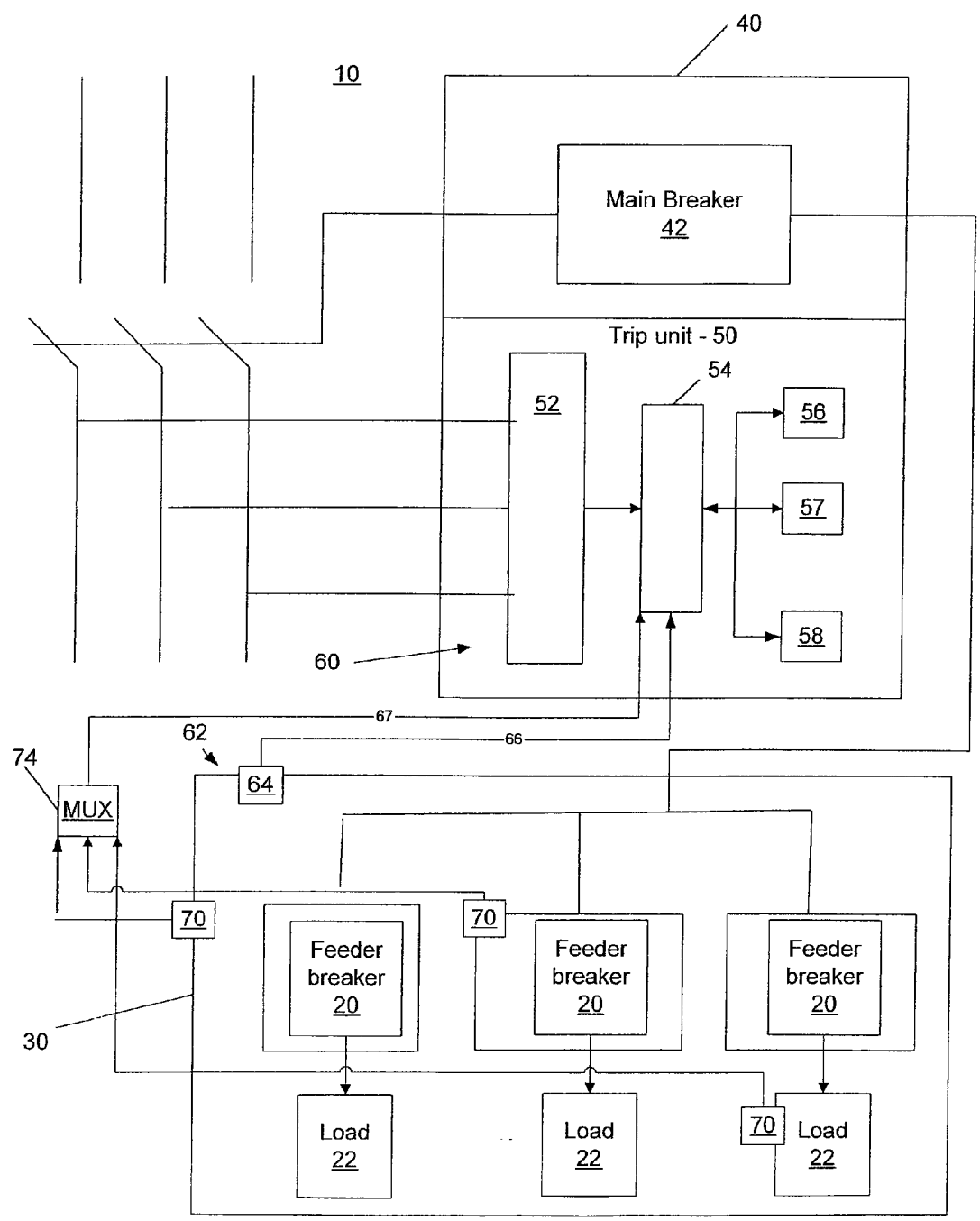
FIG. 1 is a block diagram illustratively showing an electrical distribution system equipped with sensors for determining when system components are being serviced in accordance with the present principles.

The present principles provide a system, apparatus and method for minimizing safety risks due to arc faults during maintenance of a power or main circuit breaker system. The electrical system may include detection sensors to activate a protection mode against arc flashing when a human or animal enters into a bounded dangerous area. However, during maintenance activities even the protection mode may be inadequate to protect workers against potential risk. The present principles provide a maintenance mode which senses not only the presence of a human in the bounded dangerous area, but also detects maintenance procedures being carried out. In this mode, the sensors report to a tripping device and processor that such a condition exists and further protective actions are taken or settings employed to permit the maintenance activities and ensure personnel safety.

The present principles are particularly useful with regards to high voltage applications, but are also applicable to many other applications, for example, in an engine or boiler room of a ship or building, in a nuclear reactor, in a power plant, etc. Therefore, the present principles should not be construed as limited to the illustrative examples.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown. Furthermore, embodiments of the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It should be understood that elements shown in FIGS. may be implemented on one or more appropriately programmed general purpose digital computers having a processor and memory and input/output interfaces.

Referring now in specific detail to the drawings in which like reference numerals identify similar or identical elements throughout the several views, and initially to FIG. 1, a schematic diagram shows a flash protection boundary 30 around a circuit breaker system in accordance with an illustrative embodiment.

The flash protection boundary 30 may be established around electrical equipment, which may include feeder breaker circuits 20, load circuits 22, etc. To minimize the effects of an arc flash hazard, the boundary 30 is established based on the voltage, currents and power generation values of a given electrical distribution system 10. The flash protection boundary 30 is an approach limit at a distance from exposed live electrical parts within which a person (human being) could receive second degree burns if an electrical arc flash were to occur.

An arc flash hazard occurs when electrical current flows through the air. Arc fault currents can reach temperatures up to 35,000° F. At these temperatures, materials vaporize and expand in volume. The air blast that results from an arcing fault can forcefully spread molten metal and debris over long distances. The dissipated energy during an arc fault produces intense heat, infrared and ultraviolet radiation, sound blasts, and pressure waves.

Within the established predetermined flash protection boundary 30, only "qualified" workers (personnel) are permitted and such personnel are required to use appropriately rated protective clothing. The protective measures add expense or make repair or maintenance of electrical equipment within the predetermined flash protection boundary 30 very difficult.

A control device 60 provides one way to achieve delayed tripping for trip coordination within the electrical distribution system 10 and to lower levels of arc flash hazard. The control device 60 may employ protective setting capabilities to switch between a plurality of different parameter sets 56, 57, 58, etc. corresponding to conditions related to the main circuit breaker system 40. The control device 60 is included in a trip unit 50 of a main circuit breaker system 40. The main circuit breaker system 40 is included in the electrical distribution system 10. The electrical distribution system 10 also includes at least one feeder circuit breaker 20 and at least one load circuit 22.

The control device 60 employs an input device 62 which is associated with the feeder breaker circuits 20 of the electrical distribution system 10. The input device 62 is coupled to the trip unit 50. A selector apparatus or selector 54 is coupled to the trip unit 50 and is configured to select a set of parameters 56, 57, 58, etc., where each set of parameters 56, 57, 58 define a mode of operation of the trip unit 50. The selector 54 switches from one mode to another in accordance with a feedback signal or signals 66 and/or 67 from the input device 62 or sensor devices 70. The trip unit 50 operates based on the selected set of parameters.

One set of parameters 56 can be a "normal operation" trip parameter set. The trip parameter set 56 is determined to optimize a main circuit breaker 42 for best selective trip coordination of the main circuit breaker system 40. Parameters 57 are set to determine lowest possible trip settings that will allow the main circuit breaker 42 to carry normal loads, including normal in rush currents for a particular system. The parameters 57 provide a lowest arc flash energy when it is determined that a human being (or animal) is present within boundary 30 while still maintaining power. The lowest arc flash energy as related to the instantaneous trip function of the main circuit breaker 42, may be calculated for the arc flash energy based on the available fault current in the main circuit breaker system 40 and the operating time of the main circuit breaker 42. The parameters may be set accordingly.

The control device 60 provides an instantaneous trip function in the main circuit breaker 42 only when a human being or animal is within the predetermined flash protection boundary 30. At all other times, the occupancy-based control device 60 allows the main circuit breaker 42 to be set at its normal operation mode (parameters 56). The control device 60 provides the ability to have a maximum system coordination in one mode, an optimal arc flash reduction in another mode, and a reduced or zero arc flash energy in a maintenance mode. Other modes or hybrid modes may also be implemented.

The input device 62 is positioned at the flash arc protection boundary 30 and configured to respond to the presence of a human being moving into the flash arc protection boundary 30. One exemplary embodiment of the input device 62 includes a switch 64.

The switch 64 can be a motion detector, a door switch, floor mats with contacts, an infrared system, an optical or audio frequency system, and the like. When the input device 62 detects the presence of a human being within the predetermined flash protection boundary 30, the signal 66 is transmitted to the selector apparatus 54 in the trip unit 50. It should be understood that the signal 66 can be transmitted over a hard wire circuit, by radio signal, by optical signal or by any other means.

The main circuit breaker system 40 includes an operating mechanism or main breaker 42 as well as the trip unit 50. The trip unit 50 includes a processor 52 which operates logic of the selector apparatus 54 to switch between the sets of parameters 56, 57, 58. This determines settings for an instantaneous or delayed trip of the power circuit or main breaker system 40.

In accordance with the present principles, a set of parameters 58 are set responsive to a plurality of input sensors. One input sensor may include input device 64 to determine human (or animal) presence in boundary 30. In addition, sensors 70 may be included on one or more pieces of equipment within boundary 30 or even external to the boundary 30. These sensors 70 may include contact sensors for front panel doors, fences, etc., or may include pads, motion sensors, optical sensors, ultrasonic sensors, etc. at or near specific equipment. For example, a feeder circuit breaker 20 may include a contact latch sensor (70) on a front panel or have a floor mat with contacts (70) at or near a front panel of the breaker 20. Even load circuits 22 or other devices or structures may include a sensor 70. In this way, a technician, who enters boundary 30 to make a repair or to otherwise service the electrical equipment, triggers a signal from input device or sensor 64 by being present in the boundary 30 to switch the mode of the trigger mechanism to parameters 57. When the service person approaches feeder 20, the sensor 70 at or near the breaker 20 (e.g., the floor mat with contacts, motion sensor, contact switch opened by opening or removing a panel, etc.) is activated producing a signal 67 which is input to selector mechanism 54. The mode associated with a presence (e.g., parameters 57) may be a condition for activating the maintenance mode (e.g., parameters 58), but does not have to be.

The single highest risk of arc-fault hazard or electrocution is when the electrical apparatus is being maintained or serviced. During maintenance, normally-protective dead-front panels and covers are likely removed, and the user/service technician is often exposed to energized equipment that is potentially connected to stiff electrical grids that can have prospective short circuit currents as high as 200,000 amps, for example. The National Electrical Code requires that protective clothing and gear be worn to protect against these dangers.

In accordance with the present principles, equipment panels, doors, enclosures or other protection equipment of an electrical apparatus or system are coupled with detection means or sensors 70 (such as, e.g., limit switches, proximity switches, optical sensors, ultrasound, etc., which may be hard-wired or wireless) to sense when, e.g., a dead-front (or side panels, etc.) has or have been removed. Selector apparatus 54 receives signal 67 from the sensor or sensors 70. Any one of sensors 70 may trigger the implementation of maintenance safety parameters 58. Signal 67 may be coded to indicate which piece of equipment or area is being serviced and the logic circuitry of selector apparatus 54 may be configured accordingly to shut down only certain portions of the electrical system.

Because of the immediate potential risk to maintenance personnel, signal 67 would be set as a high priority signal and be programmed or hardwired to override any other mode (e.g., normal mode (56) or safety mode (57). In one illustrative example, the system can differentiate between conditions, for example, if signal 66 is active and signal 67 is not, then a person or animal has entered boundary and has been detected, but any equipment that is being monitored by sensors 70 has not been opened up or tampered with. In another illustrative example, if signal 66 is not active and signal 67 is, then a person or animal has not entered boundary 30, but the equipment that is being monitored by sensors 70 has been opened up or tampered with, perhaps storm damage or other events. These events may be remotely monitored.

In one embodiment, a multiplexer (or a logic circuit) 74 may be employed such that any sensor 70 sensing a maintenance condition can report to selector 54 and a single signal 67 may be used to activate the maintenance mode. A detection event by one or more of sensors 70 would automatically force the electrical trip unit (ETU) 50 into a "Super Current Limiting Arc Fault Mode" should any tripping events occur while the electrical gear is being serviced. Such "Super Current Limiting Arc Fault Mode" would set all delays to zero and put the instantaneous current into a 2× or 3× mode (5× or 6× if a high-inrush motor starter is present). Such a low setting would not be practical for extended operation of normal loads; however, for the period of service, such low trip settings would actively limit the arc fault energy while the technicians are working on the gear, reducing the magnitude of energy expelled, if any, during a circuit breaker interruption.

The low settings, such as a zero or small trip delay and low instantaneous current tolerance during periods of maintenance during a maintenance mode, reduce safety concerns by reducing potential for arcing and if an arc occurs reducing the magnitude of its energy. The present systems and methods provide the needed safety for servicing electrical or other equipment and may obviate the need for protective clothing and other costly safety measures for conventional safety procedures.

Figure 2:
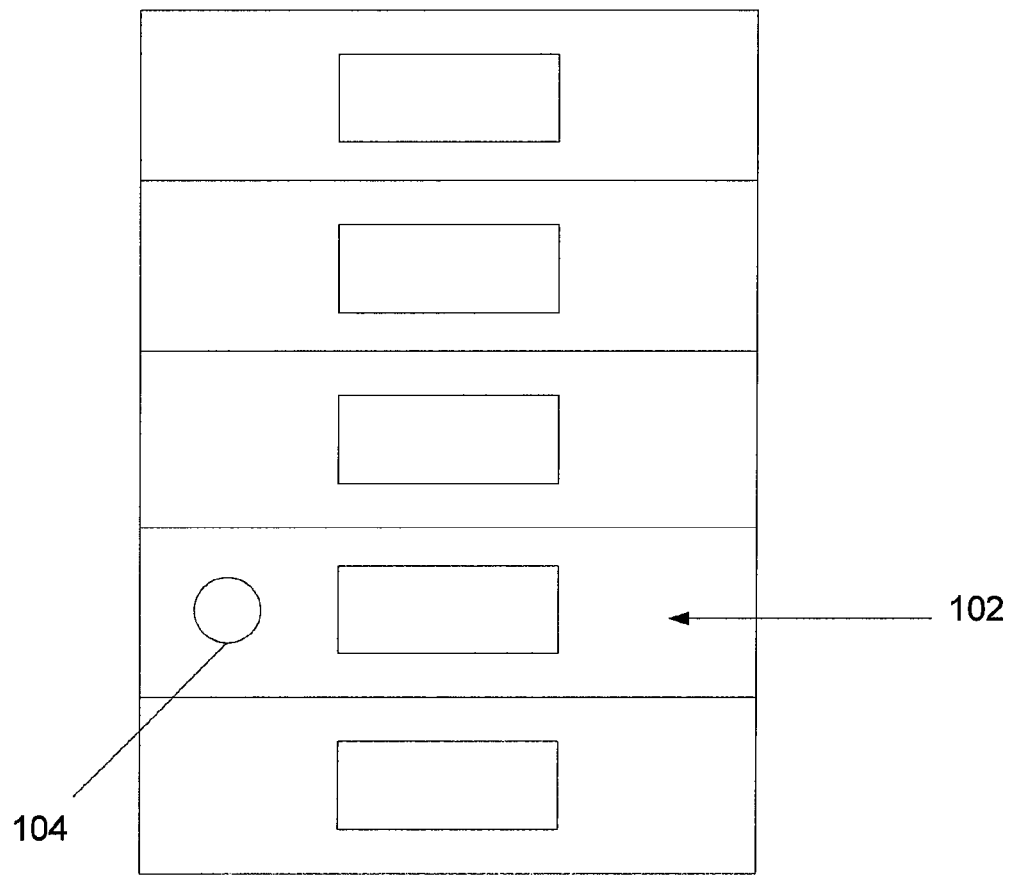
FIG. 2 is an illustrative diagram showing a circuit breaker configured to act as a maintenance condition sensor in accordance with one illustrative embodiment.

Referring to FIG. 2, the system and apparatus in accordance with the present principles may be integrated into deployed systems or may be custom designed into new ones. A sensor 70 (FIG. 1) may be a feature integrated into switchboards or switchgear, and may take the form of a breaker switch 102 on a switch panel 103 equipped with a sensor device 104. In one example, sensor device 104 may be powered by electrical rails (not shown) that power the switchboard 103. The sensor device 104 may include an optical sensor which can detect when an enclosure where the sensor device 104 is located is either opened or closed. The sensor device 104 may also detect other conditions or be adapted to do so. Other conditions may include the removal of a front or side panel of an electrical box, detection of tripping of other breakers, etc. Other embodiments may include contact switches or other devices that provide the same functions. Other embodiments may include, instead of a breaker, a switchboard or switchgear line that senses a maintenance condition and adjusts the tripping unit 50 (FIG. 1). Other safety measures that may be provided include that the switchboard or switchgear lines include extra insulated bussing or connectors to make the arcing fault less likely to occur.

Figure 3:
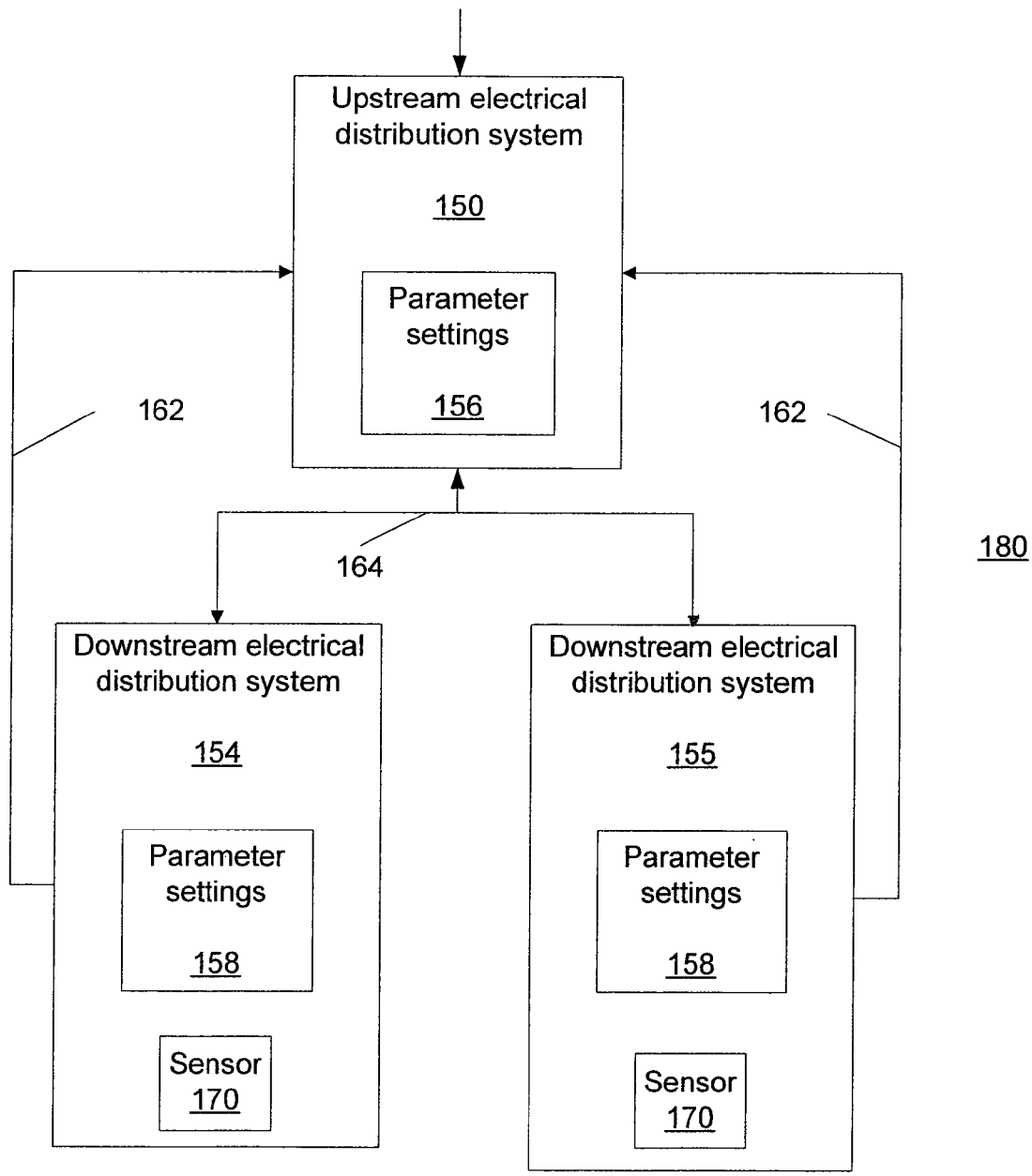
FIG. 3 is a block diagram illustratively showing an upstream electrical distribution system configurable in accordance with downstream sensed conditions to improve safety in accordance with the present principles.

Referring to FIG. 3, a block diagram illustratively depicts a larger portion of an electrical distribution system 180. System 180 includes downstream electrical distribution systems 154 and 155, which may be similar to those described with reference to system 10 (FIG. 1). Downstream electrical distribution systems 154 and 155 include sensors 170, which are similar to the sensors 70 (and/or 64) as described above. During a maintenance mode, sensor states (e.g., panels removed, doors opened, etc.) are detected and parameter settings 158 (similar to parameters 58 described above) are adjusted accordingly.

In accordance with one embodiment, the parameter settings 158 of one or more of downstream electrical distribution systems 154 and 155 are reported back to an upstream electrical distribution system 150 using a feedback or reporting communication line or channel 162. Line 162 may include a wired, wireless, optical, electrical, or any other media to convey the maintenance mode state of the downstream electrical distribution systems 154 and 155 to the upstream electrical distribution system 150. In one embodiment, an electrical powerline 164 may be employed to convey the feedback parameter settings 158 to upstream electrical distribution system 150. It should be understood that the number of links in the electrical distribution chain may be many and the feedback for system 180 may extend to higher levels in a hierarchy of an electrical distribution matrix or grid. It also should be understood that there may be any number of downstream electrical distribution systems 154 and 155 or upstream electrical distribution systems 150.

By feeding back the parameters 158, a main breaker and/or triggering unit of the upstream electrical distribution system 150 can be programmed in the same way as described for the system 10 of FIG. 1. In this way, a redundant protection system is created where parameter settings 156 are derived from or copied from the parameters settings 158 to reduce the potential energy for arc flash and/or reduce delay time for tripping a main or feeder breaker. In this way, electrical energy is checked at both upstream and downstream locations creating a zone selective interlocking type of arrangement and adding an additional level or levels of protection.

Figure 4:
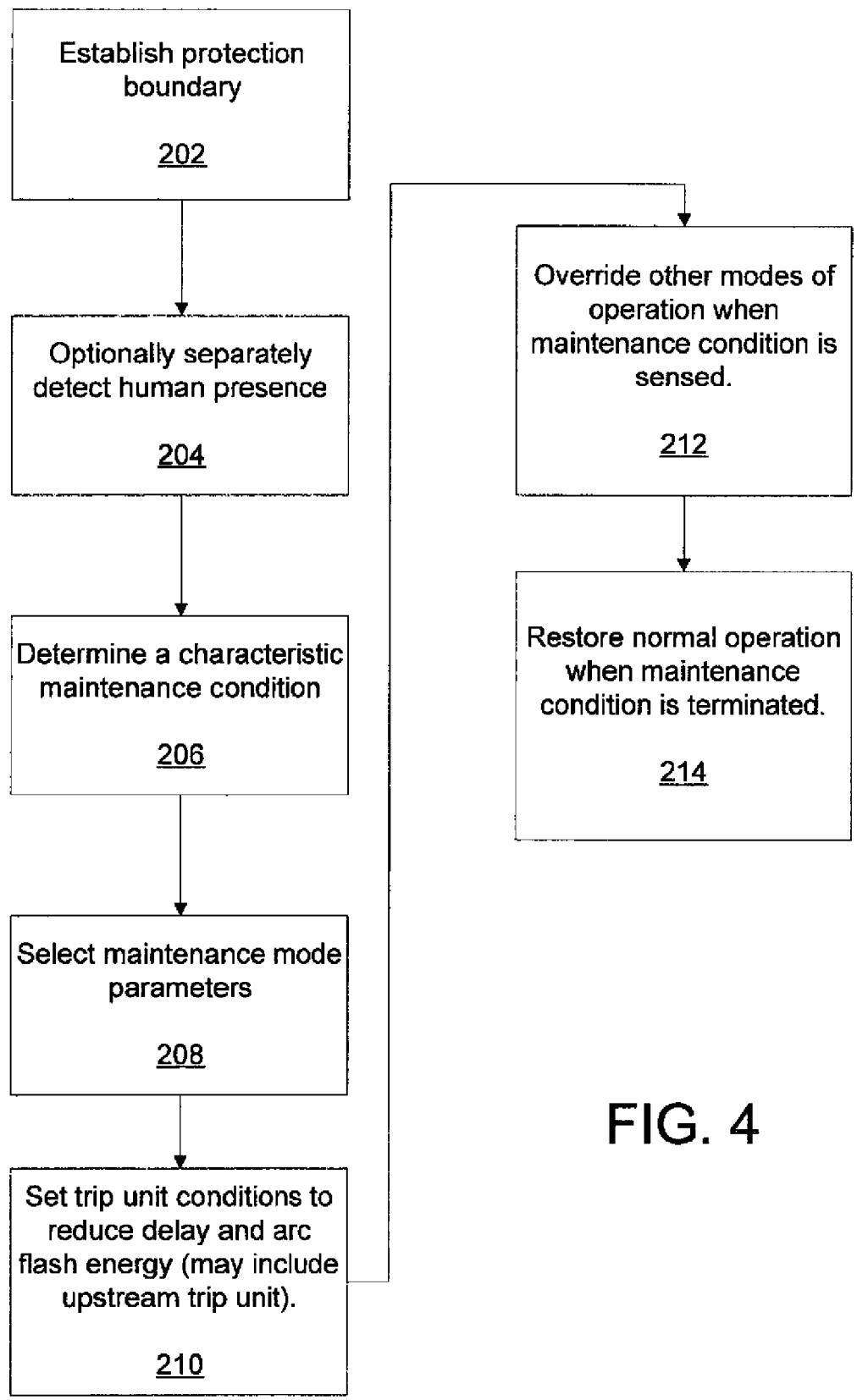
FIG. 4 is a flow diagram showing a method for controlling and minimizing arc flash in accordance with one illustrative embodiment.

Referring to FIG. 4, a method for protecting maintenance service personnel is illustratively depicted in accordance with an illustrative embodiment. In block 202, a protection boundary is established around an electrical distribution system or other system. A human presence sensor is preferable included. In block 204, a presence of human personnel may separately be detected in an area of the electrical distribution system. The presence of a human being is detected by the input sensor that monitors a boundary surrounding the electrical distribution system.

In block 206, a characteristic maintenance condition is determined. The characteristic maintenance condition may include opening or removing a door or panel of a protective enclosure. This may also include monitoring sensors to determine when certain equipment is disturbed, opened or otherwise changed to prepare to or actually service system components of the system.

In block 208, maintenance mode parameters are selected in accordance with a signal generated to indicate both human presence and the characteristic maintenance condition. The signal may represent only the characteristic maintenance condition, but more accurate results are provided when employing the results of the human detection process as well.

In block 210, trip conditions for a trip unit are set to reduce arc flash energy and tripping delay during the characteristic maintenance condition. The settings may include, e.g., setting the maintenance mode parameters to include a trip delay time setting of zero or substantially zero and/or setting the maintenance mode parameters to include an instantaneous current sensitivity of at least, e.g., 2 times greater than a normal operating mode. This may include setting an upstream electric system or node tripping parameters or energy levels to secure additional protection. In block 212, other modes of operation of the trip unit are overridden when the characteristic maintenance condition is sensed. In block 214, normal operation is restored when the maintenance condition is terminated (e.g., restoring a door or panel, etc.

Having described preferred embodiments for integrated automatic selection of maintenance mode in electrical tripping systems to minimize arc fault energy (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as outlined by the appended claims. Having thus described the invention with the details and particularity required by the patent laws, what is claimed and desired protected by Letters Patent is set forth in the appended claims.

What is claimed is:

1. A monitor control system for an electrical distribution system, comprising
a trip unit for a circuit breaker operational in at least three modes including a normal operation mode, a safety mode and a maintenance mode;
at least one sensor associated with the electrical distribution system and coupled to the trip unit, wherein the at least one sensor is connected to one or more components of the electrical distribution system to detect whether the electrical distribution system will be or is being serviced when a presence of a human being is also detected; and a selector coupled to the trip unit and configured to select the maintenance mode to define a mode of operation of the trip unit when the electrical distribution system will be or is being service and when the presence of the human being is also detected, wherein in the maintenance mode at least one of arc flash reduction and tripping delay reduction greater than in the safety mode are provided such that the trip unit operates based on the maintenance mode.

2. The system as recited in claim 1, wherein the at least one sensor is coupled to a door or panel of a protective enclosure.

3. The system as recited in claim 1, wherein the at least one sensor includes one of an optical sensor, an ultrasound sensor, and a contact sensor.

4. The system as recited in claim 1, wherein the maintenance mode parameters include a trip delay time setting of zero or substantially zero.

5. The system as recited in claim 1, wherein the maintenance mode parameters include an instantaneous current sensitivity of at least 2 times greater than a normal operating mode.

6. The system as recited in claim 1, wherein the presence of a human being is detected by an input sensor that monitors a boundary area of the electrical distribution system.

7. The system as recited in claim 1, wherein the at least one sensor includes a sensor adapted to fit in a circuit breaker slot in an electrical enclosure and powered by the electrical distribution system to determine whether the enclosure is opened.

8. The system as recited in claim 1, wherein the system includes a plurality of modes of operations and the maintenance mode of operation includes a highest priority such that, when sensed, overrides settings associated with any other mode of operation.

9. The system as recited in claim 1, wherein the system includes a feedback channel configured to report a safety condition to an upstream component.

10. The system as recited in claim 9, wherein upstream component adjusts tripping parameters at the upstream component in accordance with the safety condition.

11. A monitor control system for an electrical distribution system, comprising
a trip unit for a circuit breaker;
a boundary detection sensor configured to detect a human presence in a boundary surrounding at least a portion of the electrical distribution system;
at least one sensor associated with the electrical distribution system and coupled to the trip unit, wherein the at least one sensor is connected to one or more serviceable enclosures of the electrical distribution system to detect whether the electrical distribution system will be or is being serviced when the presence of a human being is also detected by the boundary detection sensor; and
a selector coupled to the trip unit and configured to select maintenance mode parameters to define a mode of operation of the trip unit, wherein, in the maintenance mode arc flash reduction and tripping delay reduction are provided such that the trip unit operates based on the maintenance mode parameters.

12. The system as recited in claim 11, wherein the serviceable enclosures include a door or panel of a protective enclosure.

13. The system as recited in claim 11, wherein the at least one sensor includes one of an optical sensor, an ultrasound sensor, and a contact sensor.

14. The system as recited in claim 11, wherein the maintenance mode parameters include a trip delay time setting of zero or substantially zero.

15. The system as recited in claim 11, wherein the maintenance mode parameters include an instantaneous current sensitivity of at least 2 times greater than a normal operating mode.

16. The system as recited in claim 11, wherein the at least one sensor includes a sensor adapted to fit in a circuit breaker slot in an electrical enclosure and powered by the electrical distribution system to determine whether the electrical enclosure is opened.

17. The system as recited in claim 11, wherein the system includes a plurality of modes of operation and the maintenance mode of operation includes a highest priority such that, when sensed, overrides settings associated with any other mode of operation.

18. The system as recited in claim 11, wherein the system includes a feedback channel configured to report a safety condition to an upstream component.

19. The system as recited in claim 18, wherein upstream component adjusts tripping parameters at the upstream component in accordance with the safety condition to provide further protection.

20. A method for protecting service personnel, comprising:
detecting with a first sensor a presence of service personnel in an area of an electrical distribution system;
detecting with a second sensor a characteristic maintenance condition including when the electrical distribution system will be or is being serviced when the first sensor detects the presence of service personnel in the area of the electrical distribution system;
selecting maintenance mode parameters in accordance with a signal generated by the detection of the characteristic maintenance condition; and
setting trip conditions for a trip unit to reduce arc flash energy and tripping delay during the characteristic maintenance condition.

21. The method as recited in claim 20, wherein setting includes setting the maintenance mode parameters to include a trip delay time setting of zero or substantially zero.

22. The method as recited in claim 20, wherein setting includes setting the maintenance mode parameters to include an instantaneous current sensitivity of at least 2 times greater than a normal operating mode.

23. The method as recited in claim 20, wherein the presence of service personnel is detected by an input sensor that monitors a boundary area encompassing at least a portion of the electrical distribution system.

24. The method as recited in claim 20, further comprising overriding other modes of operation of the trip unit, with the maintenance mode of operation, when the characteristic maintenance condition is sensed.

25. The method as recited in claim 20, wherein setting trip conditions includes reporting a safety condition to an upstream component, wherein the upstream component adjusts tripping parameters at the upstream component in accordance with the safety condition.

26. A monitor control system for an electrical distribution system, comprising
a trip unit for a circuit breaker;
at least one sensor associated with the electrical distribution system and coupled to the trip unit, wherein the at least one sensor is connected to one or more components of the electrical distribution system to detect whether the electrical distribution system will be or is being serviced when a presence of a human being is also detected, and wherein the at least one sensor includes a sensor adapted to fit in a circuit breaker slot in an electrical enclosure and powered by the electrical distribution system to determine whether the enclosure is opened; and a selector coupled to the trip unit and configured to select maintenance mode parameters to define a mode of operation of the trip unit, wherein, in the maintenance mode at least one of arc flash reduction and tripping delay reduction are provided such that the trip unit operates based on the maintenance mode parameters.

* * * * *